(12) United States Patent
Han (10) Patent No.: US 7,030,932 B2
(45) Date of Patent: Apr. 18, 2006

(54) APPARATUS AND METHOD FOR CONVERTING MULTI-SOURCE INPUT IMAGES

(75) Inventor: Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 09/908,206

(22) Filed: Jul. 17, 2001

(65) Prior Publication Data

US 2002/0008780 A1    Jan. 24, 2002

(30) Foreign Application Priority Data

Jul. 18, 2000    (KR) ............................... 2000-41111

(51) Int. Cl.
*H04N 11/20*        (2006.01)

(52) U.S. Cl. ...................................... 348/554

(58) Field of Classification Search .............. 348/554, 348/555, 556, 557, 558, 563, 564, 565, 567, 348/569, 706, 705, 441, 445, 446, 449, 458, 348/459, 388.1; 345/603–605
See application file for complete search history.

(56) References Cited

U.S. PATENT DOCUMENTS

| | | | |
|---|---|---|---|
| 5,276,436 A * | 1/1994 | Shaw et al. ................. | 345/603 |
| 5,473,381 A * | 12/1995 | Lee ............................. | 348/441 |
| 5,625,416 A * | 4/1997 | Tseng et al. .............. | 348/388.1 |
| 5,721,593 A * | 2/1998 | Suh ............................ | 348/564 |
| 5,796,442 A * | 8/1998 | Gove et al. ................. | 348/556 |
| 5,805,148 A * | 9/1998 | Swamy et al. .............. | 345/547 |
| 5,850,266 A * | 12/1998 | Gimby ........................ | 348/558 |
| 5,943,508 A * | 8/1999 | Penney et al. ................ | 710/51 |
| 5,999,220 A * | 12/1999 | Washino ...................... | 348/441 |
| 6,104,437 A * | 8/2000 | Taira et al. ................. | 348/563 |
| 6,147,712 A * | 11/2000 | Shimamoto et al. ........ | 348/446 |
| 6,175,387 B1 * | 1/2001 | Han ............................ | 348/565 |
| 6,204,884 B1 * | 3/2001 | Lee ............................. | 348/555 |
| 6,208,388 B1 * | 3/2001 | Farleigh ...................... | 348/705 |
| 6,256,068 B1 * | 7/2001 | Takada et al. .............. | 348/441 |
| 6,307,592 B1 * | 10/2001 | Go .............................. | 348/453 |
| 6,329,998 B1 * | 12/2001 | Han ............................ | 345/581 |
| 6,353,460 B1 * | 3/2002 | Sokawa et al. ............. | 348/555 |
| 6,370,198 B1 * | 4/2002 | Washino ................. | 375/240.26 |
| 6,373,527 B1 * | 4/2002 | Lee ............................. | 348/564 |
| 6,380,983 B1 * | 4/2002 | Miyazaki et al. ........... | 348/554 |
| 6,388,711 B1 * | 5/2002 | Han et al. .................... | 348/441 |
| 6,421,094 B1 * | 7/2002 | Han ............................ | 348/569 |
| 6,437,834 B1 * | 8/2002 | Tagami ....................... | 348/705 |
| 6,501,509 B1 * | 12/2002 | Han ............................ | 348/441 |
| 6,667,773 B1 * | 12/2003 | Han ............................ | 348/441 |

* cited by examiner

*Primary Examiner*—Paulos M. Natnael
(74) *Attorney, Agent, or Firm*—Lee, Hong, Degerman, Kang & Schmadeka (57) ABSTRACT

An apparatus and a method for converting multi-source input images are disclosed. The apparatus includes an outside interface part including N outside interface units and pre-processing the input image, a format converting part including N format converters and converting formats and sizes of the pre-processed images as required by a display device, a memory part interacting with each format converter and storing each pre-processed image or format-converted image, a switching part switching the format-converted images according to a display mode, a multiplexer multiplexing the switched images and generating a corresponding display image, and a display processor processing the display image for the display device. Therefore, various input images can be properly converted to have desired formats and sizes based on a display mode of a display device so that the converted multi-images can be adequately displayed on a display device.

16 Claims, 6 Drawing Sheets

APPARATUS AND METHOD FOR CONVERTING MULTI-SOURCE INPUT IMAGES

BACKGROUND OF THE INVENTION

1. Field of the Invention

The present invention relates to digital televisions, and more particularly, to a multi-source image format converter that receives various types of input images and converts their formats and sizes in order to adequately display them on a display device according to a display mode.

2. Background of the Related Art

As a result of a recent introduction of digital televisions, various new television systems are currently being introduced. For example, some of them are built-in type digital television sets that decode and display compressed digital image data, a set-top box (STB) that only contains a decoding function, and digital ready television sets for receiving output signals from STB or analog image signals. These digital systems receive various input image signals such as high definition level (HD) and standard level (SD) image signals, computer or video image signals, and analog signals. When such various input image signals are inputted to a display device, the output image also needs to have various formats. For that reason, a multi-source format converter is necessary.

Among the digital television sets mentioned earlier, especially the digital ready television sets are presumed to be widely used in the future due to several advantages they have. They are considered as analog television sets with extended capabilities or new types of TV sets. The conventional analog TV sets perform a simple function such as receiving input images having a limited format and generating output images having a similar format. Therefore, they did not necessitate an additional multi-source format converter or image-processing device. For example, even expensive analog TV sets converts and displays various input images using a simple format converter having limited capabilities. On the other hand, the digital TV sets must receive input images having various formats such as analog NTSC images, personal computer images (VGA, XGA), 480P, 720P, and 1080I (interlaced) formats. Also, various display functions must be provided for digital ready TV sets such as PIP (picture-in-picture), multi-PIP, POP (picture-outside-picture), split-screen, freeze, zoom-in, zoom-out, and graphics. More importantly, they must provide an outstanding image quality as well as the special functions and capabilities mentioned earlier.

However, the conventional format converter is not suitable for performing complicate functions in digital TV sets such as the digital ready TV sets. In other words, it is impossible to convert various input images to output images having various formats using the conventional format converter. Its limited expandability also results conflicts when additional input image data need to be displayed as well as prior input image.

SUMMARY OF THE INVENTION

Accordingly, the present invention is directed to an apparatus and method for converting multi-source input images that substantially obviates one or more problems due to limitations and disadvantages of the related art.

An object of the present invention is to provide an apparatus and method for converting multi-source input images that allows users to be able to display input images having various formats and sizes on a display device using a switching function according to a display mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for converting multi-source input images includes an outside interface part including N outside interface units and pre-processing said input images; a format converting part including N format converters and converting formats and sizes of the pre-processed images as required by a display device; a memory part interacting with each format converter and storing each pre-processed image or format-converted image; a switching part switching the format-converted images according to a display mode; a multiplexer multiplexing the switched images and generating a corresponding display image; and a display processor processing said display image for said display device.

In another aspect of the present invention, a method for converting multi-source input images includes pre-processing the input images; converting formats and sizes of the pre-processed images as required by a display device; storing each pre-processed image or format-converted image in a memory part; switching the format-converted images according to a display mode; multiplexing the switched images and generating a corresponding display image; and processing the display image for the display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
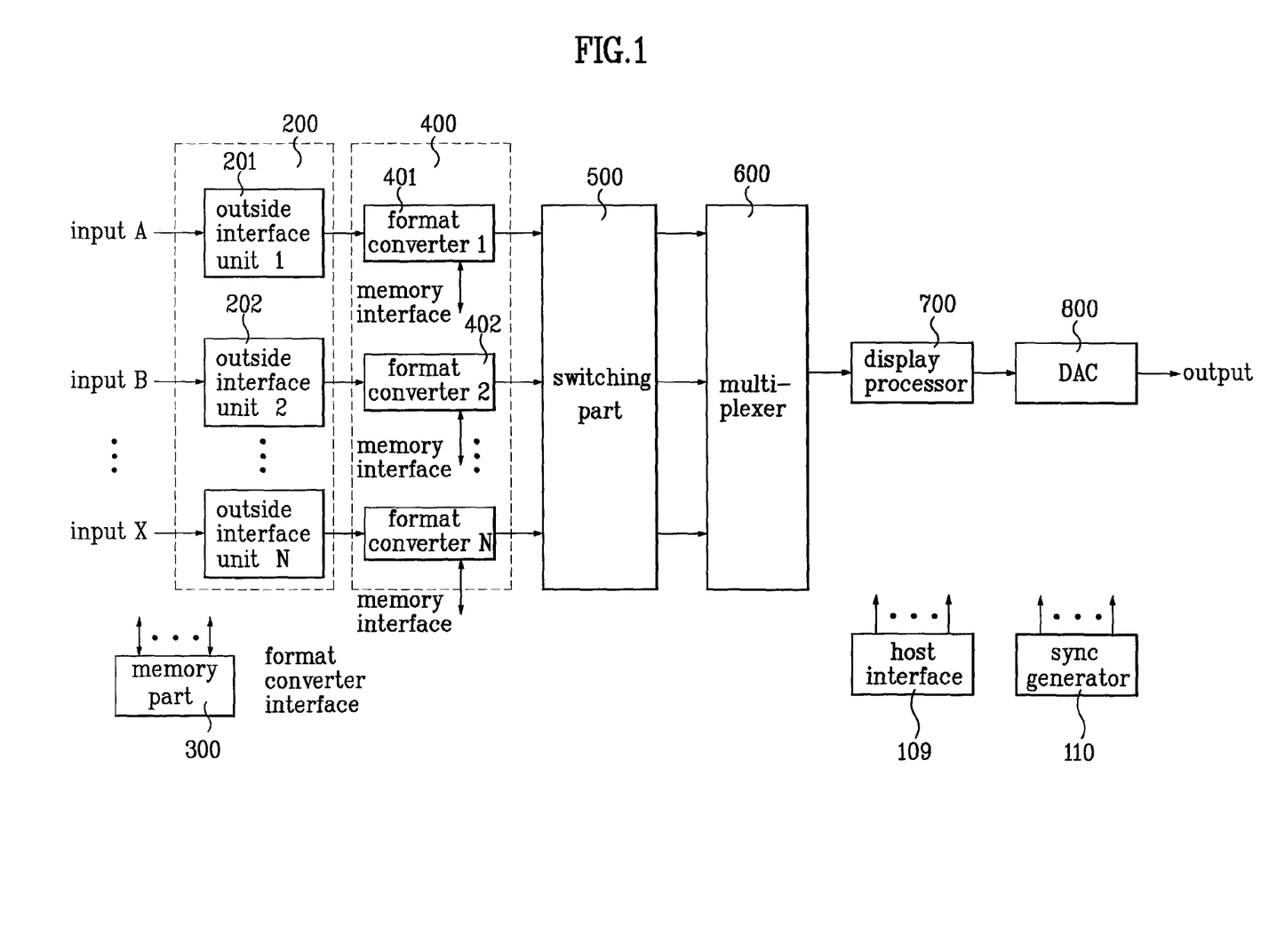
FIG. 1 is a block diagram illustrating an apparatus for converting formats of multi-source input images according to the present invention.

FIG. 1 is a block diagram illustrating an apparatus for converting multi-source input images according to the present invention. It includes the following: an outside interface part (200) that includes at least one (N) outside interface units (201, 202, ...) and performs a pre-process on each input image for its proper format conversion; a format converting part (400) including at least one (N) format converters (401, 402, ...) receives the pre-processed images having various sizes from each outside interface unit and converts formats and sizes of the pre-processed images as required by the display device; a memory part (300) that stores the image data during the format conversion either before or after the conversion; a switching part (500) that assigns each the format-converted images to a main or sub image according to their priority order; a multiplexer (600) that receives the switched images provided from the switching part (500) and generating a corresponding display image based on a particular display mode such as PIP, POP, multi-PIP, and a split-screen; a display processor (700) that converts the display image generated from the multiplexer (600) for the display device; and a DAC (800) that converts the image outputted from the display processor (700) to analog signals. It further includes a host interface (109) and a sync generator (110) as shown in FIG. 1. The figure also shows that each outside interface unit is connected parallel to each format converter.

The outside interface part (200) pre-processes the input images having various formats for their proper format conversions. For example, color formats of typical images are RGB, YcbCr, YUV, YIQ, and TDbDr. Typical output images from personal computers such as VGA, SVGA, or XGA generally have a RGB color format. On the other hand, digital TV images based on MPEG generally have an YcbCR color format. Moreover, conventional analog NTSC images ordinarily have a YIQ or YUV color format. Finally, PAL (phase alternation by line) systems widely used in Europe have an YdbDr color format. Therefore, outside interface units convert input images having various color formats into images having a single color format required by the format-converting part (400). The changed color format remains unchanged until the display processor (700) changes it to a color format of the display device.

Moreover, the input images may be in a total 24 bits format such as RGB images (each R, G, and B has 8 bits) or total 16 bits format such as YCbCr (each Y and CbCr has 8 bits). NTCS images may be in a 16 bits or 8 bits format (D1 format). The outside interface part (200) converts the input image data into data having a fixed number of bits format required by the format-converting part (400) so that each format converter can effectively converts a corresponding input image.

In a case where input images contain abnormal image data, the outside interface part (200) eliminates the abnormal data for each input image. It also reads other information of the input image such as its size, frame rate, and scanning format and provides them to the format-converting part (400) for effective data processing.

Each format converter (401, 402, ...) in the format-converting part (400) converts each input image into an image data having a particular size and format required by a display device. For instance, when an input image and its corresponding output image have progressive and interlaced scanning formats, respectively, the format-converting part (400) converts the input image data to data having an interlaced scanning format. On the contrary, when the input and output images have interlaced and progressive scanning formats, respectively, it converts the input image data to data having a progressive scanning format. Since converting to the progressive scanned data is a much more complicate process than converting to the interlaced scanning, the original images can be degraded if the scanning format conversion is not performed properly. For that reason, the format-converting part (400) converts the scanning format by using motion information obtained from field images.

The format-converting part (400) also changes the size of the input image to a desired output size in a display image. For example, when converting from a NTSC input image to a HDTV output image, it initially converts the input image to a progressive scanned image and converts the size of the image. In a case where the HDTV image needs to be displayed as a sub image in a PIP display mode, the size of the HDTV image is reduced according to the size of the PIP sub image. If the object of the format-converting device is to simply change the size of an input image, the device may require only one format converter. However, more than one format converter is required when many images needs be displayed in a display image according to a display mode such as PIP, POP, multi PIP, and split-screen. Each of the format converters has an identical or similar structure, but the input images inputted to each of them may not be the same. For example, in a case where NTSC signals, "640× 480P" VGA signals, and "1920×1080I" HD signals are received as inputs by the outside interface part (200), respectively, then each of the format converters (401, 402, ...) uses 13.5 MHz, 25 MHz, and 74.25 MHz of clock rates, respectively. These clocks are generated in a sync generator (110).

The memory part (300) stores the input images and images before or after their format conversions depending upon the format/size of each input or output images. The switching part (500) switches (assigns) each of the images received from the format-converting part (400) to either a main image or a sub image and outputs the switched (assigned) image. For example, when two images are inputted to the display device simultaneously, the switching device (500) selects one for displaying as a main image, and the other for displaying as a sub image. This selection depends on the display mode or input selections that can be controlled by users.

The multimplexer (600) inserts the sub-images into the main-image in a display image. Accordingly, a corresponding display image includes a main image and the sub-images that are inserted into the main image of a display mode set to PIP or multi-PIP. In a display image corresponding to a display mode such as POP or slit-screen, all the images are separately displayed in the display image. The display processor (700) converts the display image in order to be displayed on the display device properly. Some of the functions of the display processor (700) are color format conversions, gamma conversions, and a graphic process. Since the display image may be required to have a particular color format such as YpbPr or RGB, the display processor converts the color format of the image to the required format. Each of various display devices such as CRT, projection TV sets, LCD, PDP has its own characteristics, so it is necessary to perform a gamma correction for each display device. For this reason, the display processor (700) performs an appropriate gamma correction according to the display device. The display processor (700) also includes a graphic process because digital TV sets receive various types of data and require more sophisticated user interfaces. The images generated from the display processor (700) are outputted as analog signals by DAC (800) or are outputted as digital images for digital devices such as PDP television sets.

The host interface (109) controls the overall system. When more than one images are outputted to a display device, the host interface (109) controls the format converting part (400), the switching part (500), the multiplexer (600), the display processor (700), and the sync generator (110). The sync generator (110) generates the necessary sync signals to each part of the system. For example, the sync generator generates sync signals that combine with input image signals and are inputted to the outside interface part (200) and the format-converting part (400). It also generates sync signals synchronizing with the display device to the format-converting part (400), the switching part (500), the display processor (700), or the DAC (800).

Figure 2:
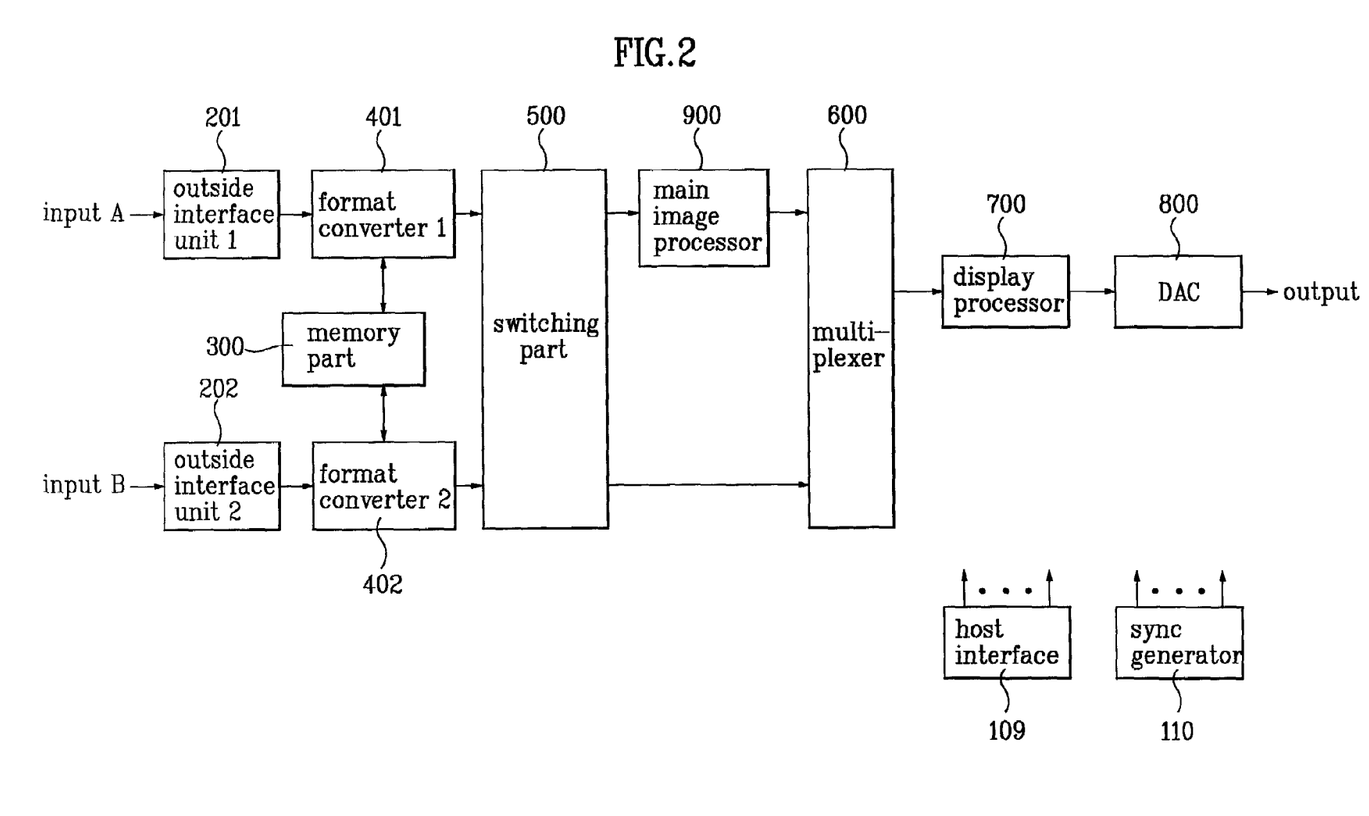
FIG. 2 is a block diagram illustrating an apparatus for converting formats of multi-source input images having two input images according to the present invention.
Figure 3:
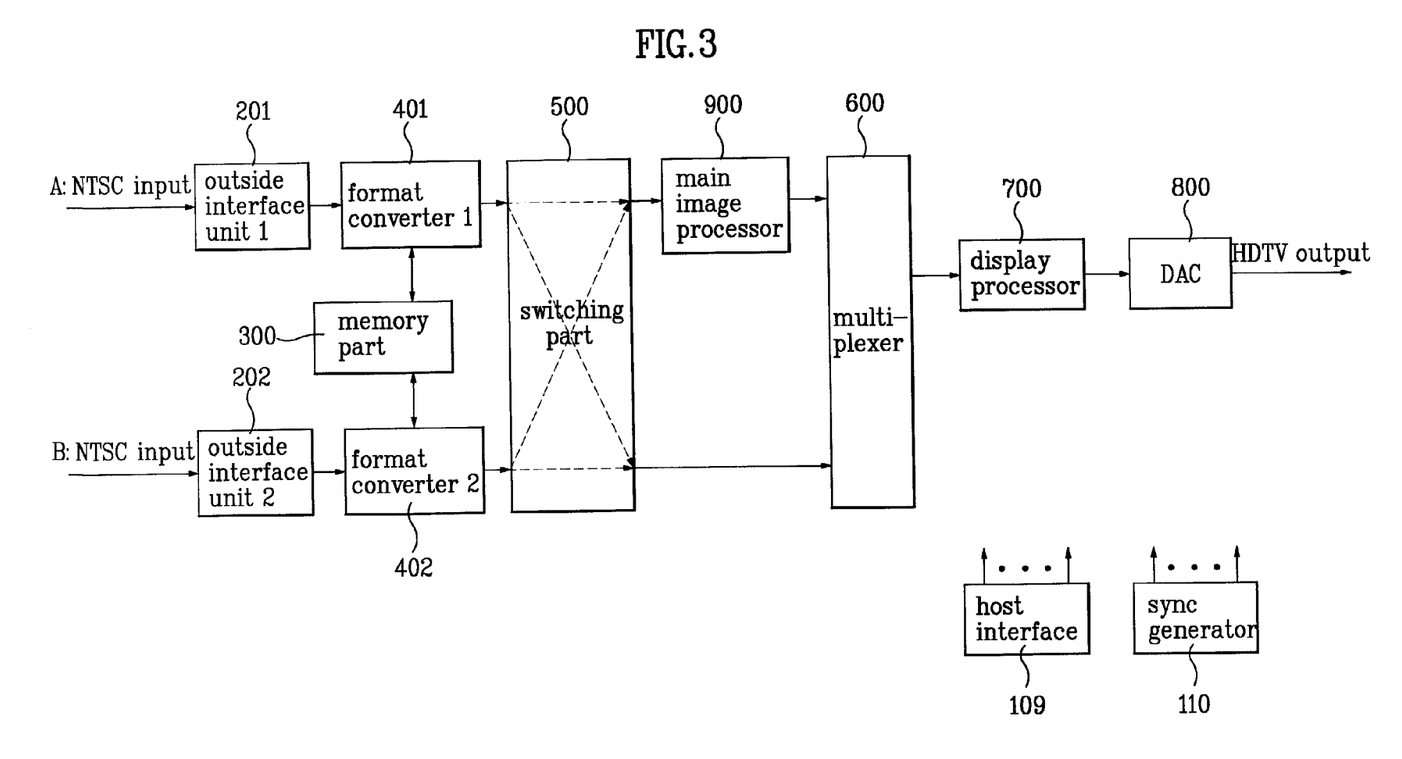
FIG. 3 is a block diagram illustrating a first example of an apparatus for converting formats of multi-source input images having two input images.

FIG. 2 illustrates a block diagram of an apparatus for converting multi-source input images according to the present invention where there are two input images. The input A or B in FIG. 2 can be any one of various images such as conventional TV images (NTSC), PC images (VGA, SVGA, XGA), and digital images (HD or SD). One of two input images or both can be displayed on the display device. When displaying only one of the images, the switching part (500) assigns or switches it to a main image and outputs the assigned (switched) image to the multiplexer (600) through a main image processor (900). Since the image quality of the main image is extremely important, various algorithms for improving the image quality can be applied to the main image processor (900). The multiplexer transmits the main image received from the main image processor (900) to the display processor (700). In order to properly display the multi-images on a display device, input and output image clock signals and the structure of the format-converting part (400) must be used properly. FIG. 3 is a block diagram illustrating a first example of a multi-source format converter having two input images, and FIG. 4 is a block diagram illustrating a format converter located in the format converting part (400).

According to FIG. 3, NTSC images are inputted as an input A and B to the outside interface part (200), and HDTV main and sub images in a display image are generated. In a case where the NTSC input image is to be displayed as a HDTV main image, the input image needs to be enlarged. In a case where the NTSC input image is to be displayed as a HDTV sub-image, the input image also needs to be enlarged if the size of the PIP sub image is larger than the size of the NTSC input image. In both cases, the image data preprocessed in the outside interface units (201,202) are stored in the memory part (300). Then the sizes of the images are enlarged in the format converters (401, 402), and the enlarged images are outputted to the switching part (500). Each format converter (401, 402) stores a corresponding input image in the memory part (300) by using the muxes as shown in FIG. 4, and it converts the image format while reading the stored image data. Clocks synchronizing with input image signals are used when storing the data in the memory part (300), and on the other hand, clocks for displaying are used to read the image data stored in the memory part (300) before the format conversions.

In a case where the size of the HDTV sub image is larger than the size of a NTSC input image, the image can be displayed as a main image or sub image when the format converters (401, 402) have a same mode. In other words, without changing the mode of each format converter (401, 402), each of the NTSC input images can be displayed as a main image or sub image by simply changing the connections in the switching part (500).

Figure 4:
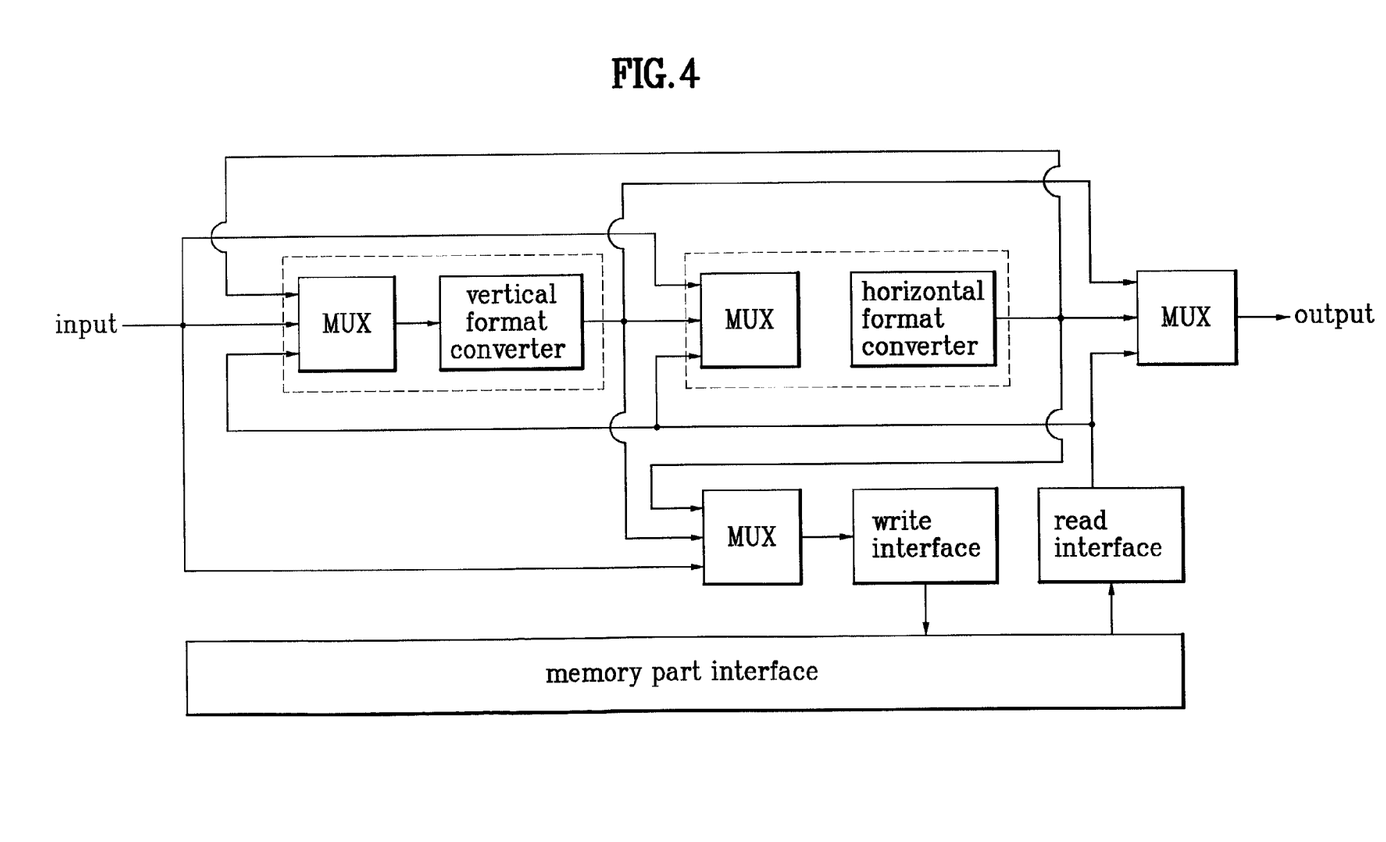
FIG. 4 is a block diagram illustrating a structure of a format converter located in a format converting part.

FIG. 4 illustrates the structure of a format converter (401, 402, . . . ) used in a format-converting part (400). It includes a vertical format converter (VFC), a horizontal format converter (HFC), a write interface, a read interface, a memory part interface, and several muxes. The mode of the format converter depends on the sizes of the input and output images, and the mode conversions are achieved by controlling the muxes located inside of the format converter.

For example, when the size of the output image is equal to or larger than the input image, the input image is stored in the memory part (300) by using clocks for input image signals. After the format converters (401, 402, 403) reads the images stored in the memory part (300), each converter increases the number of the vertical lines of each input image using the vertical format converter and increases the number of the horizontal pixel numbers of the input image using the horizontal format converter. Finally, the converted image is outputted to the switching part (500). On the contrary, when the size of the output image is smaller than the input image, the number of horizontal pixels is reduced using the horizontal format converter using the clocks for the input image signals, and the number of vertical lines is reduced using the vertical format converter. Thereafter, the reduced image is stored in the memory part (300). The stored image is outputted to the switching part (500) after it is read using the clocks for displaying. Thus, the format conversions are achieved by proper uses of the muxes, the clocks for input image signals, and the clocks for displaying.

Figure 5:
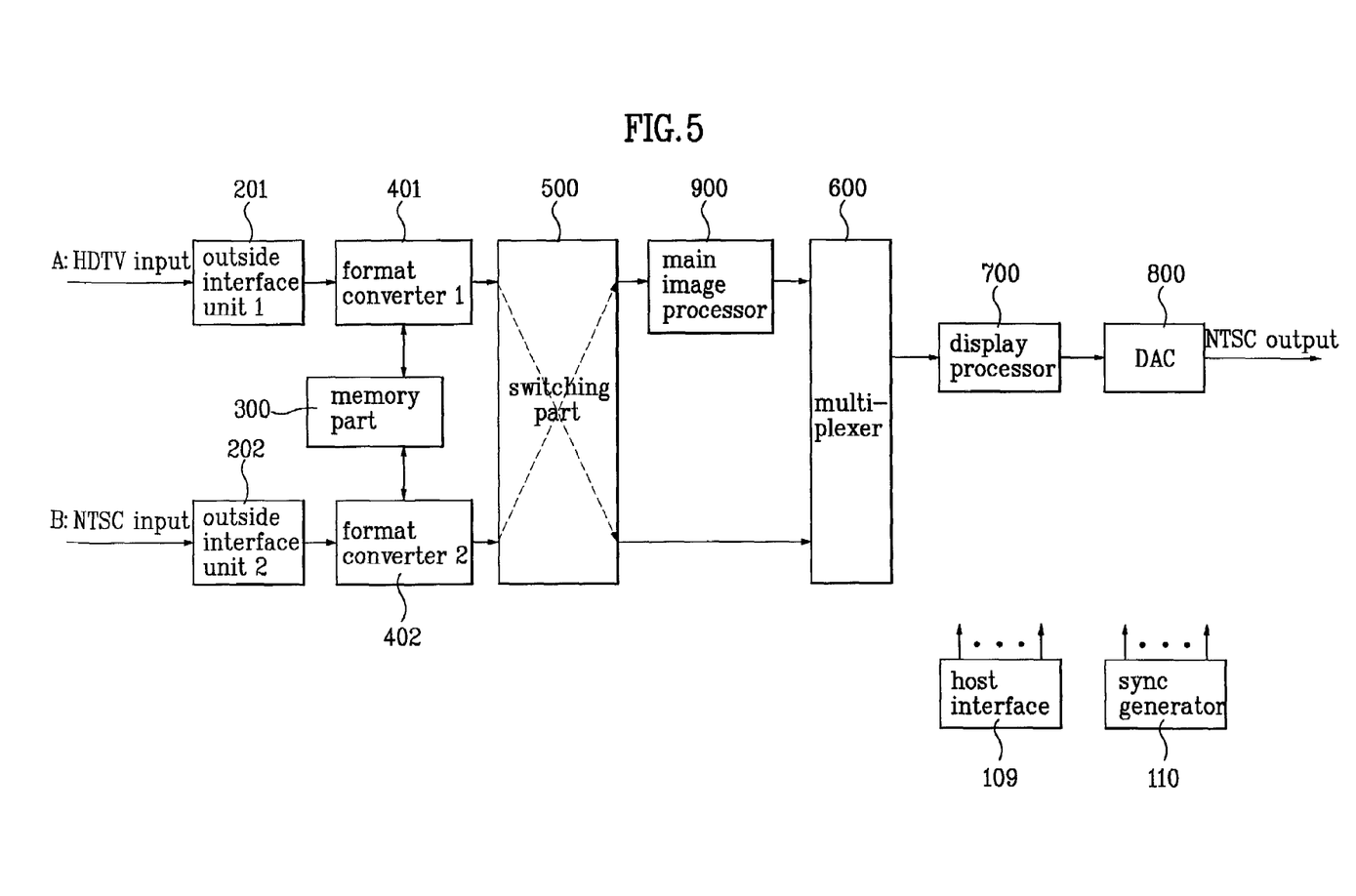
FIG. 5 is a block diagram illustrating a second example of an apparatus for converting formats of multi-source input images having two input images.

FIG. 5 is a block diagram illustrating a second example of an apparatus for converting multi-source input images having two input images. A HDTV input image and a NTSC input image (input A and B) are finally displayed as a NTSC sub image and a NTSC main image, respectively, in a NTSC display image. In order to output the HDTV input image as a NTSC sub image, the size must be reduced drastically. In this case, the format-converting part (400) reduces the size of the input image using the clocks for HDTV input images and stores the reduced image in the memory part (300). After the stored image is read using the clocks for NTSC displaying, the image is outputted as the NTSC sub image by using the switching part (500). For outputting the NTSC input image as a NTSC main image, the inputted image can be directly displayed without any conversions. In this case, the input image is directly stored in the memory part (300) using the clocks for NTSC input images. After the stored image is read using the clocks for NTSC displaying, the image is outputted as a NTSC main image. Thus, the modes of both format converters (401, 402) are different, and selections of the modes are based on input and output size information.

Figure 6:
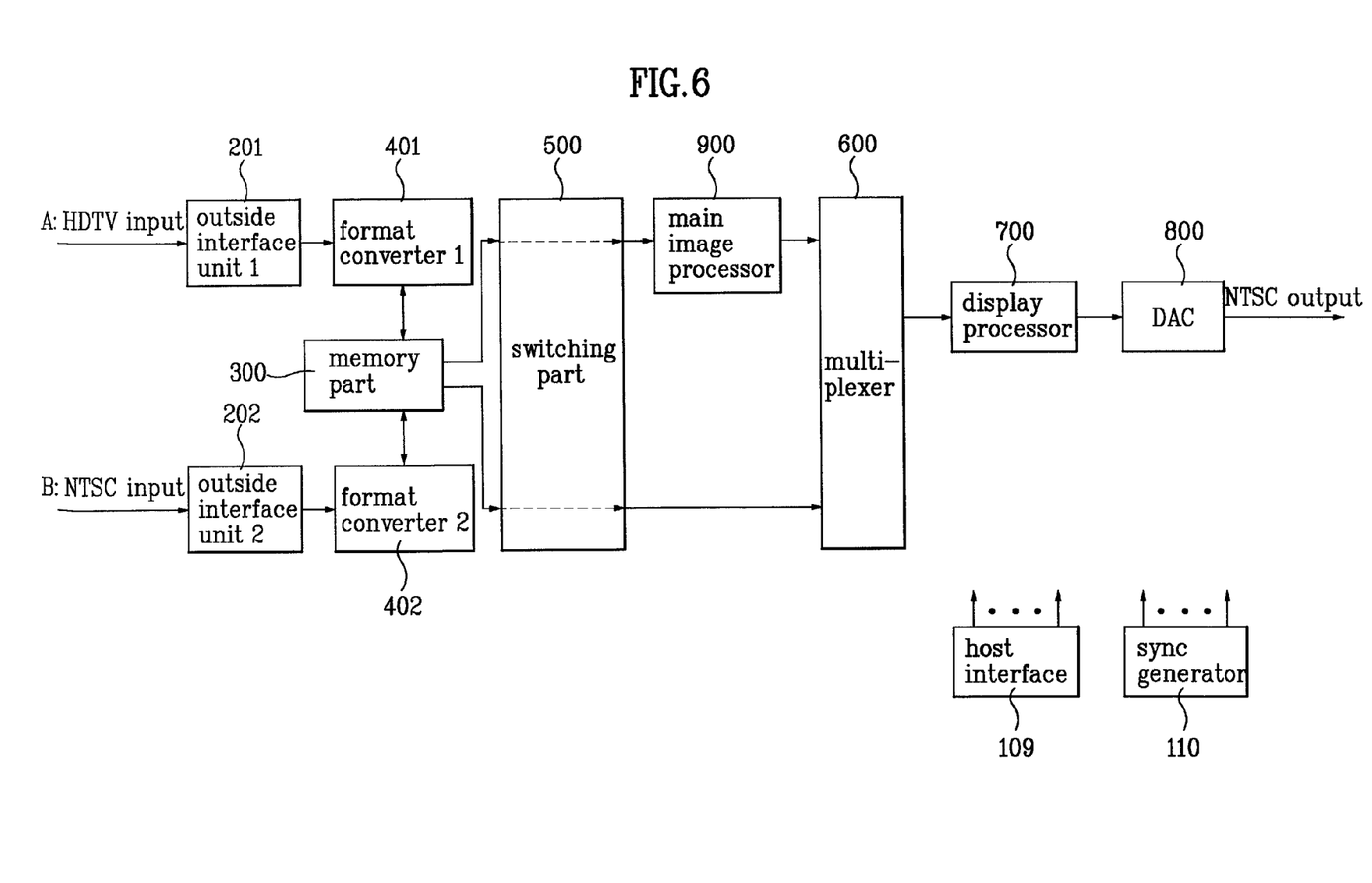
FIG. 6 is a block diagram illustrating a third example of an apparatus for converting formats of multi-source input images having two input images.

The FIG. 6 is a block diagram illustrating a third example of a multi-source format converting apparatus having two input images. A HDTV input image and a NTSC input image (input A and B) are displayed as a NTSC main image and a NTSC sub image in a NTSC display image. In order to display the HDTV input image as a NTSC main image, the size of the image must be significantly reduced. In such case, the memory part (300) stores the image after it reduces the size of the input image to the size of the NTSC main image. Then the converter reads the stored image using the clocks for NTSC displaying, and the image is outputted using the switching part (500).

On the other hand, in order to display the NTSC input image (input B) as a NTSC sub image, the size of the input image must be reduced. In such case, the format-converting part (400) reduces the size of the input image to the size of the NTSC sub image and stores the reduced image in the memory part (300). Thereafter, it reads the stored image using the clocks for NTSC displaying and outputs the image using the switching part (500). In this case, the format converters use the different clocks, but the same mode (method) is used. Similarly, selection of such mode is based on input and output size information.

According to the examples shown in FIG. 5 and FIG. 6, the format conversions depend on the display mode, and various input images can be displayed on HDTV or NTSC TV sets by using the multi-image display device having a corresponding switching function. Therefore, corresponding output images having various sizes can be generated.

According to the present invention, the apparatus for converting multi-source input images can display various types of the input images on a single screen. In a case where new input images are added, an additional outside interface unit, an additional format converter, and an additional connection to the extra format converter can be easily added to the existing system. The present invention can be used when displaying various input images such as analog NTSC images, PC images (VGA, XGA), and digital TV images in various display modes such as a main image display, PIP, multi-PIP, POP, and multi-image display. In addition, the present invention can be used for outputting analog NTSC images, PC images, standard quality images, and high-density images. Specifically, the present invention is suitable for digital ready TV sets.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for converting multi-source input images, the apparatus comprising:
   an outside interface part comprising N outside interface units for pre-processing said input images;
   a format converting part comprising N format converters for converting formats and sizes of said pre-processed images as required by a display device, said pre-processing comprising at least one of processing each input image to have a fixed color format, processing each input image to have a fixed number of bits format, eliminating abnormal image data from each input image, and providing at least one of a size, frame rate, and scanning rate information of each input image to said format converting part;
   a memory part for interacting with each format converter and storing each pre-processed image or format-converted image;
   a switching part for switching said format-converted images according to a display mode;
   a multiplexer for multiplexing said switched images and generating a corresponding display image; and
   a display processor for processing said display image for said display device,
   wherein, depending on the display mode, when the converted format is to have an increased size with respect to size of said each pre-processed image, said format-converted images are output to said switching part by writing each pre-processed image to said memory part according to an input image clock and reading said written pre-processed image from said memory part according to the display image clock, and
   wherein, depending on the display mode, when the converted format is to have a decreased size with respect to the size of said each pre-processed image, said format-converted images are output to said switching part by writing to said memory part each format-converted image according to the input image clock and reading said written format-converted image from said memory part according to the display image clock.

2. The apparatus of claim 1, wherein said format converting part converts a scanning format of each input image to a desired scanning format of said display image.

3. The apparatus of claim 1, wherein each of said format converters includes:
   a vertical format converter enlarging or reducing a vertical size of each input image;
   a horizontal format converter enlarging or reducing a horizontal size of each input image; and
   a plurality of muxes controlling image data inputting to or outputting from said vertical and horizontal format converters and said memory part based on a type of each input image.

4. The apparatus of claim 1, wherein said memory part stores said input images and each pre-processed image or format-converted image depending upon the format or size of each input or output image.

5. The apparatus of claim 1, wherein said switching part assigns said format-converted images to one main image and at least one sub image according to said display mode.

6. The apparatus of claim 5, wherein said display image includes said main image and said at least one sub image, said at least one sub image being inserted into said main image if said display mode is set to a PIP or multi-PIP display mode.

7. The apparatus of claim 5, wherein said display image includes said main image and said at least one sub-images, said main image and said at least one sub-image being displayed separately if said display mode is set to a POP or split-screen display mode.

8. A method for converting multi-source input images, comprising:
   pre-processing said input images, said pre-processing include at least one of processing each input image to have a fixed color format, processing each input image to have a fixed number of bits format, eliminating abnormal image data from each input image, and providing at least one of a size, frame rate, and scanning rate information of each input image to a format converting part;
   converting formats and sizes of said pre-processed images as required by a display device;
   storing each pre-processed image or format-converted image in a memory part;
   switching said format-converted images according to a display mode;
   multiplexing said switched images and generating a corresponding display image; and
   processing said display image for said display device,
   wherein, depending on the display mode, when the converted format is to have an increased size with respect to size of said each pre-processed image, said format-converted images are output to said switching part by writing each pre-processed image to said memory part according to an input image clock and reading said written pre-processed image from said memory part according to the display image clock, and wherein, depending on the display mode, when the converted format is to have a decreased size with respect to the size of said each pre-processed image, said format-converted images are output to said switching part by writing to said memory part each format-converted image according to the input image clock and reading said written format-converted image from said memory part according to the display image clock.

9. The method of claim 8, wherein said converting step includes converting a scanning format of each input image to a desired scanning format of said display image.

10. The method of claim 8, wherein said memory part stores said input images and each pre-processed image or format-converted image depending upon the format or size of each input or output image.

11. The method of claim 8, wherein said switching step includes assigning said format-converted images to one main image and at least one sub-image according to said display mode.

12. The method of claim 11, wherein said display image includes said main image and said at least one sub-image, said at least one sub-image being inserted into said main image if said display mode is set to a PIP or multi-PIP display mode.

13. The method of claim 11, wherein said display image includes said main image and said at least one sub-images, said main image and said at least one sub-image being displayed separately if said display mode is set to a POP or split-screen display mode.

14. A multi-source image format converter, comprising:
at least one outside interface part adapted to pre-process at least one input image;
at least one format converting part adapted to receive said at least one pre-processed input image and convert the format and size of said at least one pre-processed input image as required by at least one display device, said pre-processing including elimination of abnormal image data from said at least one input image, and providing at least one of a size, frame rate, and scanning rate information of said at least one input image to said at least one format converting part;
at least one memory part operatively coupled to said at least one format converting part and adapted to store at least one format-converted image;
at least one switching part adapted to switch said at least one format-converted image according to a display mode;
at least one multiplexer adapted to receive said at least one switched image and generate a corresponding display image;
at least one display processor adapted to convert said display image according to display device requirements; and
at least one digital-to-analog converter receiving input from said at least one display processor,
wherein, depending on the display mode, when the converted format is to have an increased size with respect to size of said each pre-processed image, said format-converted images are output to said switching part by writing each pre-processed image to said memory part according to an input image clock and reading said written pre-processed image from said memory part according to the display image clock, and wherein, depending on the display mode, when the converted format is to have a decreased size with respect to the size of said each pre-processed image, said format-converted images are output to said switching part by writing to said memory part each format-converted image according to the input image clock and reading said written format-converted image from said memory part according to the display image clock.

15. An apparatus for converting multi-source input images, the apparatus comprising:
an outside interface part comprising N outside interface units for pre-processing said input images;
a format converting part comprising N format converters for converting formats and sizes of said pre-processed images as required by a display device, said pre-processing comprising processing each input image to have a fixed color format, processing each input image to have a fixed number of bits format, eliminating abnormal image data from each input image, and providing at least one of a size, frame rate, and scanning rate information of each input image to said format converting part;
a memory part for interacting with each format converter and storing each pre-processed image or format-converted image;
a switching part for switching said format-converted images according to a display mode;
a multiplexer for multiplexing said switched images and generating a corresponding display image; and
a display processor for processing said display image for said display device.

16. A multi-source image format converter comprising:
an outside interface part adapted to pre-process at least one input image;
a format converting part adapted to receive said pre-processed input image and convert the format and size of said pre-processed input image as required by one or more display devices, said pre-processing comprising elimination of abnormal image data from said input image, and providing a size, frame rate, and scanning rate information of said input image to said format converting part;
a memory part operatively coupled to said format converting part and adapted to store a format-converted image;
a switching part adapted to switch said format-converted image according to a display mode;
a multiplexer adapted to receive said switched image and generate a corresponding display image;
a display processor adapted to convert said display image according to display device requirements; and
a digital-to-analog converter receiving input from said at least one display processor.

* * * * *